(12) United States Patent
Aksentijevic et al.

(10) Patent No.: US 6,738,624 B1
(45) Date of Patent: May 18, 2004

(54) METHOD AND SYSTEM FOR CAPACITY REPORTING IN A MOBILE TELECOMMUNICATIONS NETWORK

(75) Inventors: Mirko Aksentijevic, Espoo (FI); Woonhee Hwang, Helsinki (FI); Antti Toskala, Helsinki (FI)

(73) Assignee: Nokia Corporation, Espoo (FI)

( * ) Notice: Subject to any disclaimer, the term of this patent is extended or adjusted under 35 U.S.C. 154(b) by 408 days.

(21) Appl. No.: 09/714,840

(22) Filed: Nov. 16, 2000

(51) Int. Cl.[7] .................................................. H04Q 7/20
(52) U.S. Cl. ...................... 455/452.1; 455/450; 455/561
(58) Field of Search .............................. 455/452.1, 453, 455/450, 422.1, 423, 424, 67.11, 561, 524

(56) References Cited

U.S. PATENT DOCUMENTS

| | | | |
|---|---|---|---|
| 5,697,054 A | | 12/1997 | Anderson |
| 6,377,548 B1 | * | 4/2002 | Chuah .......................... 370/233 |
| 6,393,276 B1 | * | 5/2002 | Vanghi ...................... 455/422.1 |
| 6,434,380 B1 | * | 8/2002 | Andersson et al. ......... 455/406 |

FOREIGN PATENT DOCUMENTS

WO    0024163    4/2000

OTHER PUBLICATIONS

Technical Specification 3GPP TS 25.433, Version 3.3.0 (Sep. 2000): *3rd Generation Partnership Project; Technical Specification Group Radio Access Network; UTRAN Iub Interface NBAP Signalling* (Release 1999), by 3GPP, Sections 8.2.7, 8.2.15, 8.2.17, 8.3.1, 8.3.6; 9.2.2.3 and 9.2.2.6 only.

* cited by examiner

*Primary Examiner*—Erika Gary

(57) ABSTRACT

A method and system for reporting processing capacity of a base station (Node B) to a radio network controller (RNC), in a mobile telecommunications system. This method enables the RNC to enhance call control and resource management, especially when the Node B employs a time division duplex (TDD), but also if a frequency division duplex (FDD) system is employed. An important feature of this method is reporting processing capacity from the Node B to the RNC using the available bit rate (ABR).

27 Claims, 10 Drawing Sheets

METHOD AND SYSTEM FOR CAPACITY REPORTING IN A MOBILE TELECOMMUNICATIONS NETWORK

TECHNICAL FIELD OF THE INVENTION

This invention relates generally to communication within a mobile telecommunications system, and more particularly this invention relates to communication between a base station (Node B) and a radio network controller (RNC) in order to enhance call control and resource management.

BACKGROUND ART

The telecommunications industry is in the process of developing a new generation of flexible and affordable communications that includes high-speed access while also supporting broadband services. Many features of the third generation mobile telecommunications system have already been established, but many other features have yet to be perfected.

One of the most important systems within the third generation of mobile communications is the Universal Mobile Telecommunications System (UMTS) which will deliver voice, data, multimedia, and wideband information to stationary as well as mobile customers. UMTS is designed to accommodate increased system capacity and data capability (UMTS is synonymous with WCDMA or wideband code division multiple access). Efficient use of the electromagnetic spectrum is vital in UMTS. It is known that spectrum efficiency can be attained using frequency division duplex (FDD) or with time division duplex (TDD) schemes, and these schemes can be employed in the context of UMTS and WCDMA.

As can be seen in FIG. 1, the UMTS architecture consists of user equipment 102 (UE), the UMTS Terrestrial Radio Access Network 104 (UTRAN), and the Core Network 126 (CN). The air interface between the UTRAN and the UE is called Uu, and the interface between the UTRAN and the Core Network is called Iu.

The UTRAN consists of a set of Radio Network Subsystems 128 (RNS), each of which has geographic coverage of a number of cells 110 (C), as can be seen in FIG. 1. The interface between the subsystems is called Iur.

Each Radio Network Subsystem 128 (RNS) includes a Radio Network Controller 112 (RNC) and at least one Node B 114, each Node B having geographic coverage of at least one cell 110. As can be seen from FIG. 1, the interface between an RNC 112 and a Node B 114 is called Iub, and the Iub is hard-wired rather than being an air interface. For any Node B 114 there is only one RNC 112. A Node B 114 is responsible for radio transmission and reception to and from the UE 102 (Node B antennas can typically be seen atop towers or preferably at less visible locations). The RNC 112 has overall control of the logical resources of each Node B 114 within the RNS 128, and the RNC 112 is also responsible for handover decisions which entail switching a call from one cell to another or between radio channels in the same cell.

The FDD method uses separate frequency bands for uplink and downlink transmissions over the Uu interface (i.e. over the air interface between UTRAN 104 and the User Equipment 102). In contrast, the TDD method allocates different time slots (compared to different frequencies) for these uplink and downlink communications. Generally, TDD is very flexible regarding the allocation of time slots, and therefore is very well-suited to applications that are asymmetric with respect to uplink and downlink data volume (e.g. web browsing entails a much higher downlink than uplink data volume). Combining FDD and TDD modes provides maximum efficiency and flexibility for third generation networks.

In order for the RNC 112 to provide effective call control and resource management to each Node B 114, it must receive information from the Node B 114 about Node B's time-dependent resources. The problem of obtaining appropriate resource information from Node B 114 has not been adequately addressed by the related art, especially with regard to TDD (as compared to FDD), and therefore the ability of an RNC 112 to provide call control and resource management has suffered.

A particularly important piece of information for the RNC 112 to receive is information about the currently available processing capacity at Node B 114. Processing capacity is to be distinguished from air interface capacity. Air interface capacity is limited by factors such as noise and interference, whereas processing capacity refers to the capacity of the Node B 114 itself to process calls. When the RNC 112 does not accurately know the processing capacity of Node B 114 that is currently available, it is very difficult or impossible for the RNC 112 to accurately allocate call traffic to the Node B 114.

It is important to understand that the processing capacity at Node B 114 varies from time to time even if the number of user equipments 102 (UE) remains the same. This variation is due to the fact that the required processing per UE 102 depends upon how the logical resources of Node B resources are used for each of the particular UEs. The required processing for a particular user can depend upon what kind of coding a user has, how many multicodes are involved, how the users are divided in different time slots (TDD only), the number of users involved in a handover (FDD only), how the user's data stream is divided if there are multiple channel elements, the quality of service assigned to a call, et cetera. Thus, it is not adequate for the RNC 112 to simply know the number of UE's that a Node B 114 is handling, because each Node B 114 may require a different type of implementation. Rather, the RNC 112 should ideally receive from the Node B 114, over the Iub interface, a simple and accurate measure of the Node B's available processing capacity without any need for specifying the particular implementations that Node B 114 is providing to each UE 102. In TDD, no adequate solution to this problem has been developed. In FDD, the problem has been partially addressed by using the spreading factor of Node B 114 as an indicator of processing capacity, and reporting this spreading factor over the Iub.

With WCDMA, information bits are spread over an artificially broadened bandwidth. This task is accomplished by multiplying the bits, using a pseudorandom bit stream. The bits in the pseudorandom bit stream are referred to as chips, so the stream is known as a chipping, or spreading, code. This spreading increases the bit-rate of the signal, and increases the amount of bandwidth occupied by the signal, by a ratio known as the spreading factor, namely, the ratio of the chip rate to the original information rate.

The spreading factor can be used with limited success to indicate processing capacity in FDD, but the spreading factor is almost completely insufficient in TDD, because the TDD spreading factor is substantially constant in the downlink to the UE 102, and furthermore the TDD spreading factor range is very narrow as compared with the FDD spreading factor range (e.g. 1–16 in TDD as compared with 4–512 in FDD). In particular cases, the spreading factor might vary between two values in TDD, but such a rough measurement would not allow the RNC 112 to meaningfully model the processing capacity of Node B 114, and thus the processing capacity parameter is currently undefined in TDD. Even in FDD, using the spreading factor is not an ideal solution, because the FDD spreading factor becomes imprecise at the start of the 4–512 scale (e.g. the spreading factor between 4 and 8 corresponds to a very large difference in processing capacity).

Information about the use of the spreading factor as an indicator of FDD processing capacity can be found, for example, in publications of the $3^{rd}$ Generation Partnership Project (3GPP). In particular, 3GPP TS 25.433 "UTRAN Iub Interface NBAP Signaling" (Version 3.3.0, September 2000) describes how the RNC 112 audits resources at the Node B 114, which then reports processing capacity by way of an audit response (section 8.2.7). The 3GPP TS 25.433 publication also describes how the Node B 114 may report to the RNC 112 at the Node B's own initiative by way of a resource status indication (section 8.2.15). These are the only two instances in which the prior art suggests reporting processing capacity from the Node B 114 to the RNC 112, and this fact unnecessarily limits the accuracy of the processing capacity of Node B 114, as perceived by the RNC 112. The 3GPP TS 25.433 publication also describes various exchanges of signal between the RNC 112 and the Node B 114 that do not involve processing capacity (see section 8.2.17 on radio link setup, section 8.3.1 on radio link addition, and section 8.3.6 on radio link deletion). Publication 3GPP TS 25.433 furthermore describes that the spreading factor is the parameter which is used to tell the RNC 112 how much capacity is being consumed by the Node B 114 (see especially sections 9.2.2.3 and 9.2.2.6).

DISCLOSURE OF THE INVENTION

The presently disclosed method is based upon a system structure similar or identical to the prior art Universal Mobile Telecommunications System (UMTS) architecture shown in FIG. 1, but the present invention solves the problem of how to report the amount of processing capacity that is currently available at a Node B 114 to an RNC 112. This invention may occur in the context of UMTS, utilizing wideband code division multiple access (WCDMA) as well as UMTS terrestrial radio access (UTRA).

The presently disclosed method, which enables the RNC 112 to enhance call control and resource management, begins with generation of a processing capacity inquiry signal. Then, a processing capacity report signal is generated and sent from the Node B 114 to the RNC 112, in response to the processing capacity inquiry signal. The processing capacity report signal has a magnitude indicative of available bit rate (ABR) associated with the base station.

Thus, the present invention utilizes the available bit rate (ABR) as a measure of processing capacity, whereas the prior art only utilizes the spreading factor for this purpose. As described previously, the spreading factor is generally not a good measure of processing capacity, especially when using TDD.

Using the available bit rate (ABR) as the TDD capacity parameter is the optimal solution to this problem. The ABR addresses the fundamental gap in the capacity modelling of Node B 114, inasmuch as a capacity parameter is currently undefined for TDD.

According to the present invention, processing capacity information is not sent from Node B 114 to the RNC 112 on a dynamic basis, but rather is sent at discrete times, and the RNC 112 uses this discrete processing capacity information to model the actual continuous processing capacity at Node B 114. When the RNC 112 inputs the ABR into its capacity model for Node B 114, the RNC 112 obtains a vastly more accurate characterization of Node B's processing capacity (in TDD) than would be obtained by inputting the Node B's spreading factor into the capacity model of Node B 114. Available bit rate (ABR) can provide for transport of traffic at the bit rate available at a given time, and therefore ABR is well-suited as a processing capacity parameter in TDD.

Even in FDD, the ABR is an excellent alternative (or supplement) to the spreading factor, for the purpose of communicating processing capacity from the Node B 114 to the RNC 112. The ABR provides better granularity than the spreading factor parameter, especially at the low end of spreading factor values where a unit change in spreading factor means a difference in spreading factor on the order of 100%. Furthermore, this ABR parameter is appropriate for FDD because it can be used independently of whichever radio transmission technology resources are being used by the system, and independent of hardware.

The present method can be used if Node B 114 utilizes an FDD system or a TDD system, or both. Likewise, the ABR may include an uplink ABR or a downlink ABR, or both. Furthermore, in FDD, the ABR can be used as the sole parameter indicative of processing capacity, or the ABR can be used in conjunction with the spreading factor to indicate processing capacity.

The capacity inquiry signal can be provided either by the RNC 112 or by a component of Node B 114 itself, as in the prior art. However, the present invention discloses additional ways by which the capacity inquiry signal can be provided by the RNC 112, and thus the present invention remedies the prior art situation in which the accuracy of the Node B's processing capacity, as perceived by the RNC 112, is unnecessarily limited. These additional ways of providing the capacity inquiry signal can be employed regardless of whether the processing capacity parameter is the spreading factor or is the available bit rate.

At a Node B 114 utilizing TDD, different bit rates occur when more codes are allocated to a user or when more time slots are allocated to the user. The Node B 114 processing resource is thus likely to be utilized at a higher rate when one time slot is allocated to multiple users as opposed to being allocated to a single user, and when one user has been allocated several time slots as opposed to a single time slot. Whatever the allocations may be, the present invention ensures that the processing capacity parameter is reported by the Node B 114 to the RNC 112 independently of the particular hardware and software implementations that each UE 102 is using.

BEST MODE FOR CARRYING OUT THE INVENTION

Figure 1:
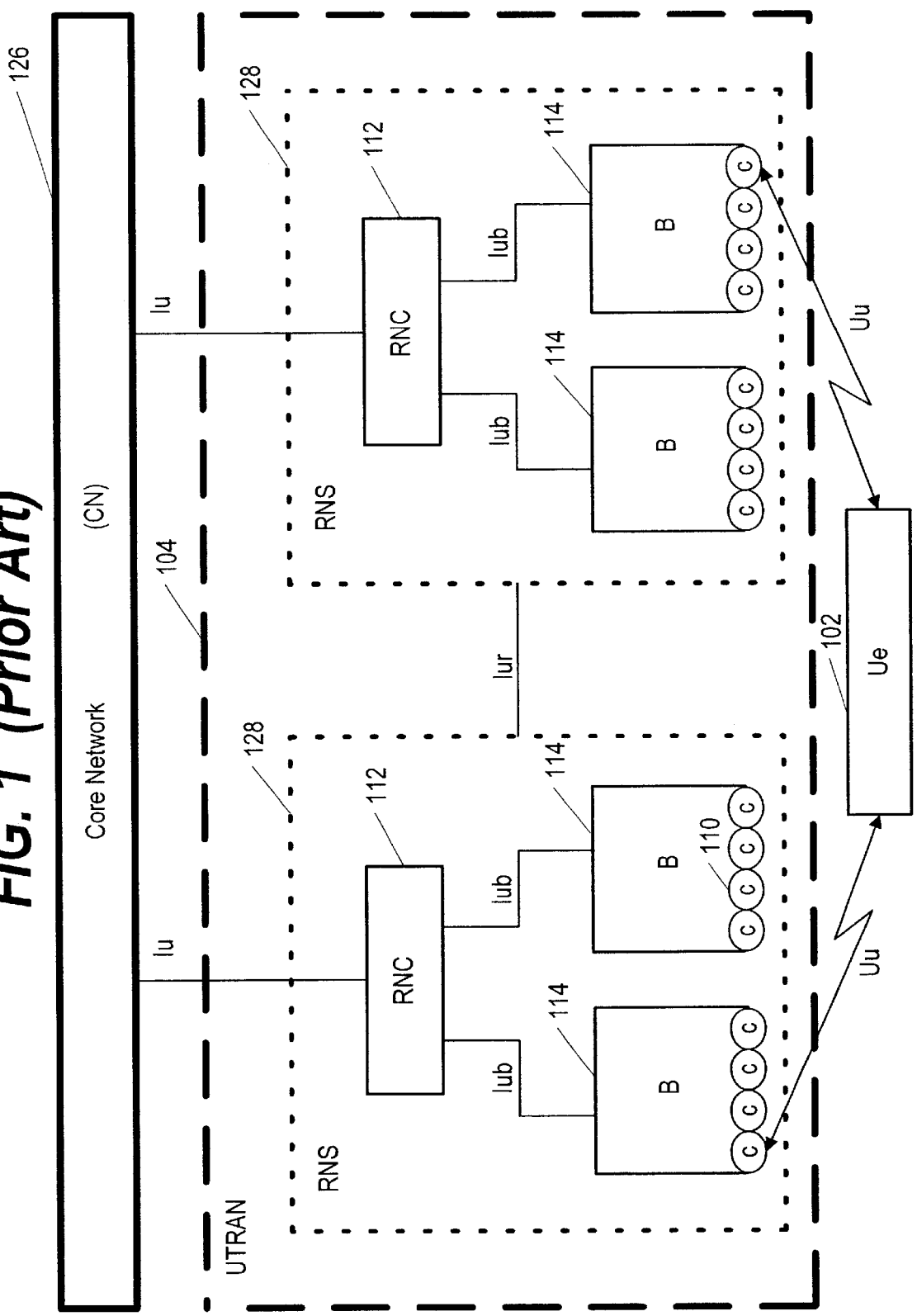
FIG. 1 shows the UMTS architecture, which is applicable to the prior art and is similar or identical to the architecture in which the present invention will operate.

In the best mode for carrying out the presently claimed invention, a processing capacity inquiry signal is generated, in response to which a processing capacity report signal is generated and sent from the Node B 114 to the RNC 112, by way of the Iub interface shown in FIG. 1. The processing capacity inquiry signal may be generated by the RNC, or by the Node B itself.

In some of the best mode embodiments of the present invention, the processing capacity report signal has a magnitude indicative of available bit rate (ABR) associated with the Node B 114. The ABR serves as a measure of Node B processing capacity, and enables the RNC 112 to effectively control call traffic and manage resources at Node B 114, regardless of whether a TDD system or an FDD system is being employed (or both). The higher the capacity at Node B 114, the more capability Node B has to handle additional calls and additional implementations for each call.

By definition, ABR provides for transport of digital traffic at the bit rate available at a given time, on a dynamic basis. The ABR of the present invention may include a single overall ABR, or an uplink ABR, or a downlink ABR, or a combination of these various ABRs. Moreover, the processing capacity report signal of the present invention may include not only ABR but also other related data such as spreading factor. In some embodiments of the present invention, the processing capacity report signal need not include the ABR, in which case the present inventive step lies in sending the processing capacity report signal in a new and better way (e.g. in more frequent circumstances).

Figure 2:
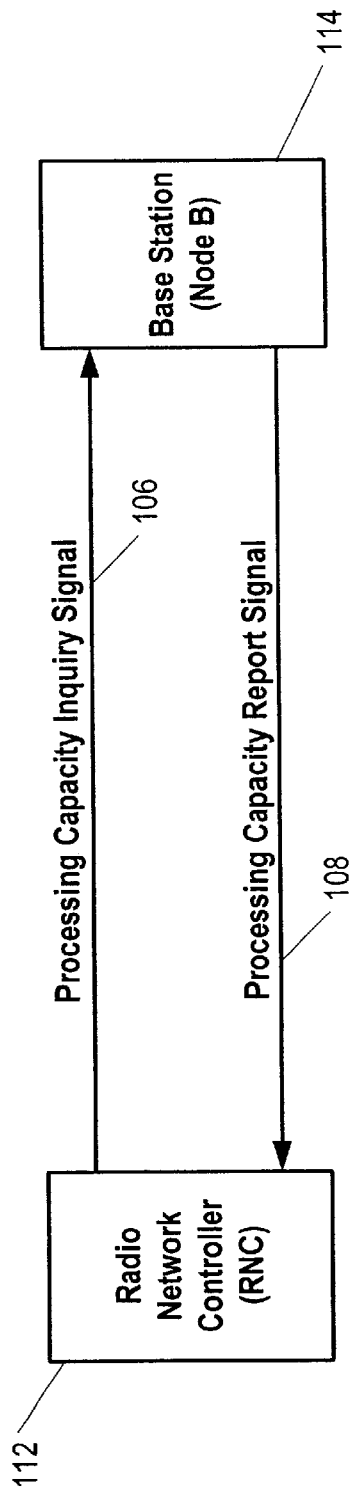
FIG. 2 shows an embodiment of the present invention, in which the Node B responds to a signal from the RNC.

FIG. 2 illustrates an example of the present claimed invention, wherein the processing capacity inquiry signal on the line 106 is sent from the RNC 112 to the Node B 114, causing the Node B 114 to respond with a processing capacity report signal on the line 108 to the RNC. When the RNC 112 inputs the ABR into its capacity model for Node B 114, the RNC 112 obtains an accurate characterization of Node B's processing capacity.

Figure 3:
FIG. 3 shows an embodiment of the present invention in which processing capacity is reported in conjunction with an audit.

FIG. 3 shows a more particular example of the present invention, essentially showing a special case of that illustrated by FIG. 2. As indicated by FIG. 3, the RNC 112 is auditing the configuration and status of logical resources in the Node B 114. Thus, the RNC 112 sends an audit request and processing capacity inquiry signal on the line 106 to the Node B 104. This signal can either be part of the audit request, or can accompany the audit request. In any case, the Node B responds by providing an audit response and processing capacity report signal on the line 108 to the RNC 112, and the RNC thus obtains the ABR necessary to accurately model the processing capacity of Node B 114.

Figure 4:
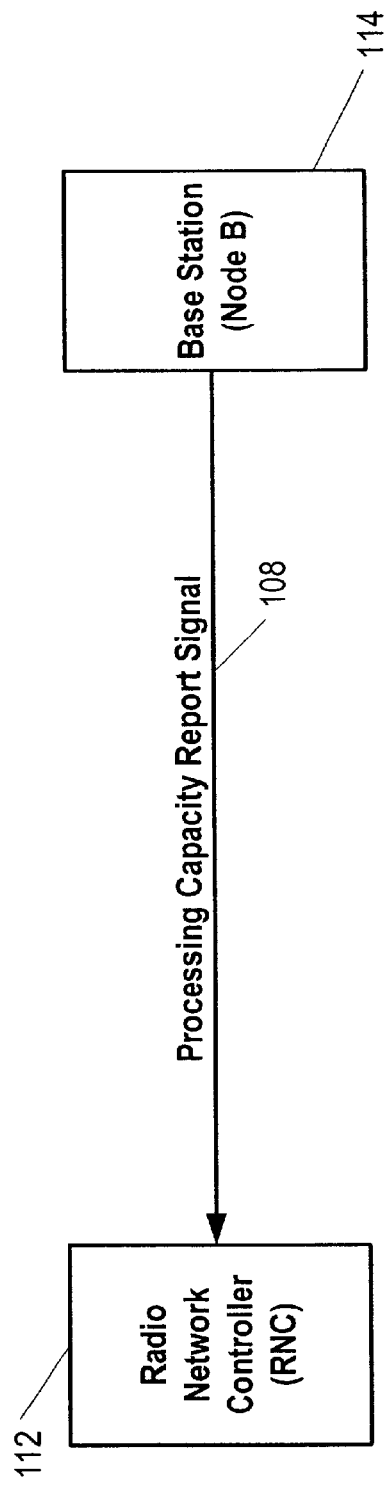
FIG. 4 shows an embodiment of the present invention in which processing capacity is reported without any request from the RNC.
Figure 5:
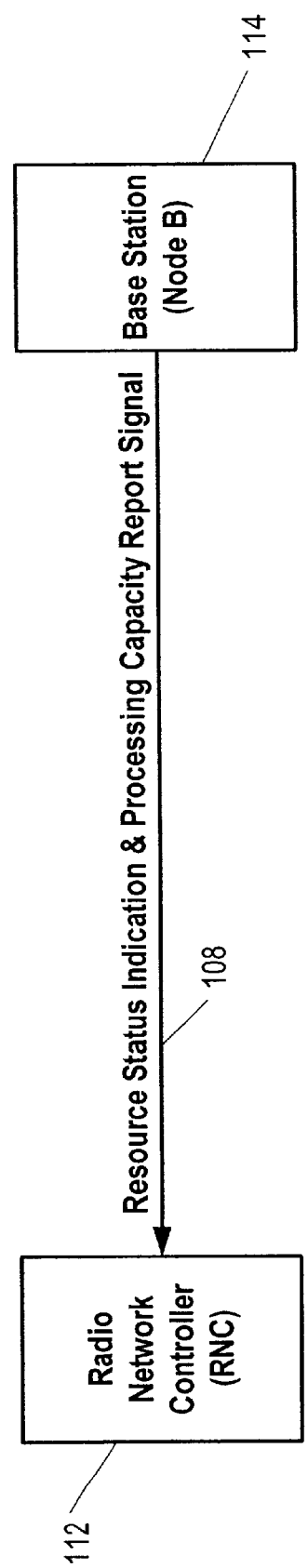
FIG. 5 shows an embodiment of the present invention in which processing capacity is reported as part of a resource status indication.

As mentioned, the entire procedure for reporting the Node B's processing capacity can be initiated by the Node B itself, and an example is illustrated by FIG. 4, and is also illustrated by FIG. 5 which essentially shows a special case of FIG. 4. In FIG. 4, we see that the Node B 114 provides a processing capacity report signal on the line 108 to the RNC 112, without any external request to Node B 114. The Node B may detect a change in its own processing capacity, and then a component of Node B would generate a processing capacity inquiry signal causing Node B to provide the processing capacity report signal on the line 108 to the RNC.

In the particular case illustrated by FIG. 5 (which is basically a special case of that shown by FIG. 4), the Node B 114 and the RNC 112 are utilizing a resource status indication procedure, and as part of that procedure the processing capacity is reported. A resource status indication procedure may be triggered in various different situations, such as when a cell becomes existing at the Node B 114, when a cell is to be deleted at Node B, when cell capabilities change at Node B 114, when channel capabilities change at Node B, when a control port changes its state at Node B 114, or when Node B has changed its resource capability. If any of these triggering events occurs, then the Node B 114 sends a resource status indication and processing capacity report signal on the line 108 to the RNC 112.

Figure 6:
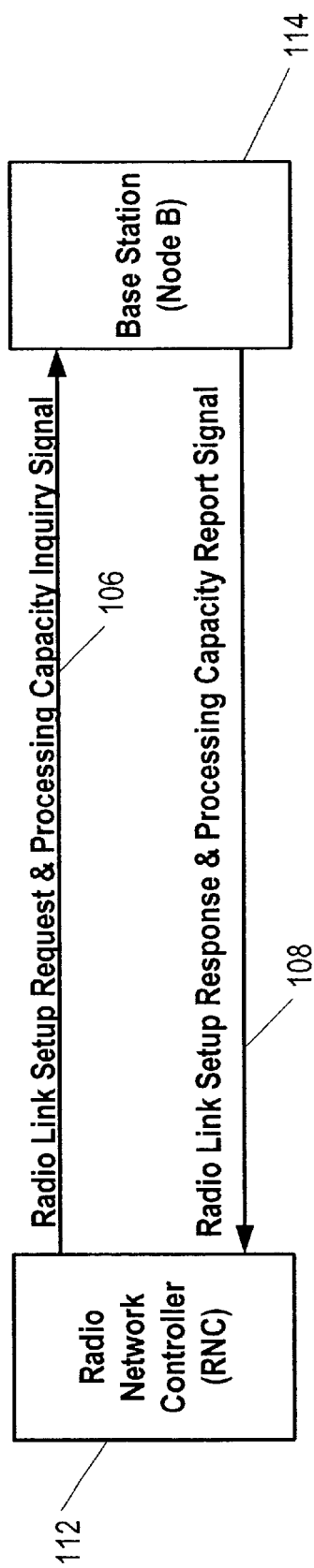
FIG. 6 shows an embodiment of the present invention in which processing capacity is reported as part of a radio link setup.

FIG. 6, like FIG. 3, exemplifies a special case of the best mode shown by FIG. 2. As discussed, FIG. 2 shows processing capacity being reported by an exchange of signals between the RNC 112 and the Node B 114. Likewise, in FIG. 6, we see that this exchange can occur in conjunction with a radio link setup request. The purpose of including processing capacity within the radio link setup process is simply to provide an additional opportune time for reporting processing capacity to the RNC 112. The more often processing capacity is reported to the RNC 112, the more accurate will be the RNC's approximations and modeling of the dynamic processing capacity at the Node B 114 (regardless of whether processing capacity is indicated by ABR or by some other parameter such as spreading factor). Generally speaking, a radio link setup procedure is used for establishing necessary resources for a new Node B communication context at the Node B 114. This is an opportune time for the RNC 112 to provide a radio link setup request and processing capacity inquiry signal on the line 106 to the Node B 114, and for the Node B to respond by providing a radio link setup request and processing capacity report signal on the line 108 to the RNC 112. The radio link setup information and the processing capacity information may be sent together or with some small separation, but in either case we may view them as being sent approximately concurrently. Likewise, the Node B may simply be programmed to interpret the radio link setup request as also being a processing capacity inquiry signal.

Figure 7:
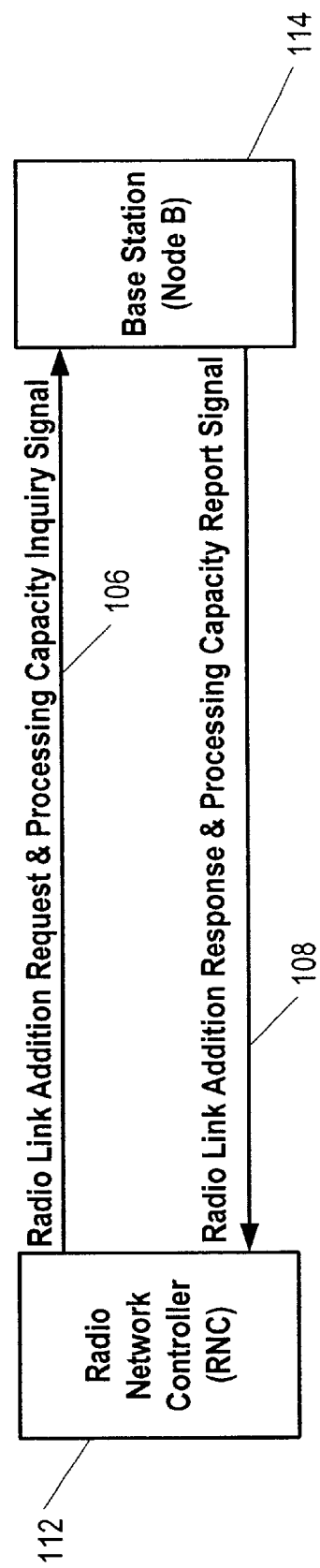
FIG. 7 shows an embodiment of the present invention in which processing capacity is reported as part of a radio link addition.
Figure 8:
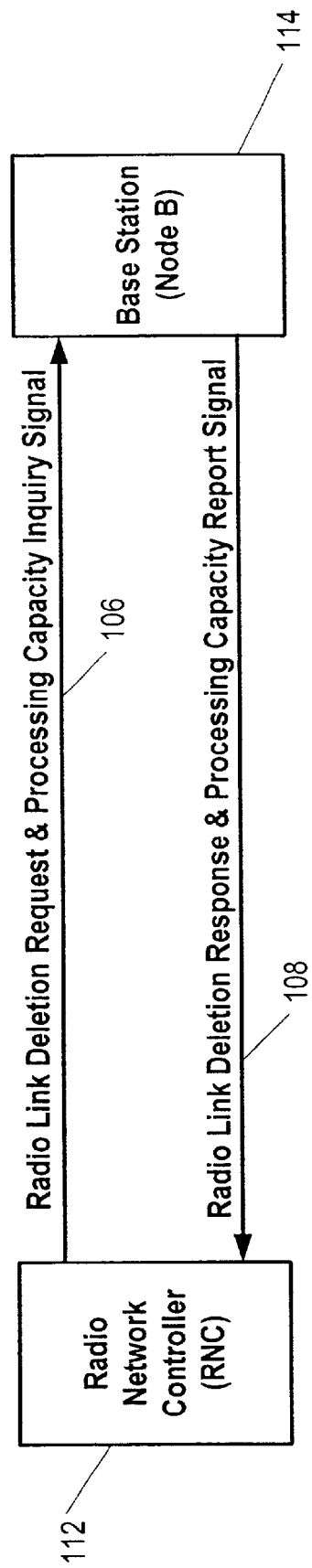
FIG. 8 shows an embodiment of the present invention in which processing capacity is reported as part of a radio link deletion.

FIGS. 7 and 8 further exemplify the best mode of the present invention, and these two examples are similar to FIG. 6 in that they entail exchanging signals between the RNC 112 and the Node B 114, in order for the RNC to obtain the processing capacity information from the Node B. As with FIG. 6, we again have a situation shown in FIG. 7 (and FIG. 8) in which there is a useful opportunity to provide an additional report of processing capacity to the RNC 112. This is a useful opportunity because the more often processing capacity is reported to the RNC 112, the more accurate will be the RNC's approximations and modeling of the dynamic processing capacity at the Node B 114, regardless of whether processing capacity is indicated by ABR or by some other parameter such as spreading factor.

The exchange of signals shown by FIG. 7 occurs in the context of a radio link addition request. This procedure is used for establishing the necessary resources in the Node B 114 for one or more additional radio links to a user when there is already a Node B communication context for this user in the Node B 114. Similarly, the exchange of signals shown by FIG. 8 occurs in the context of a radio link deletion request. This procedure is used to release resources in a Node B 114 for one or more established radio links already in place to a user.

Using the best mode of the present invention, as exemplified and illustrated by FIGS. 1 through 8, allows the RNC 112 to be more aware of the capacity at Node B 114, especially with respect to TDD. This allows the RNC 112 to control the call in advance, and, for instance, divert a call to another Node B 114 if a particular Node B has insufficient capacity from a processing or power point of view. Even in FDD, the present invention provides more precise granularity. Furthermore, in both FDD and TDD, the additional claimed methods for reporting capacity to the RNC 112 will result in an RNC 112 that is more aware of the time-dependent capacity at each Node B 114.

Figure 9:
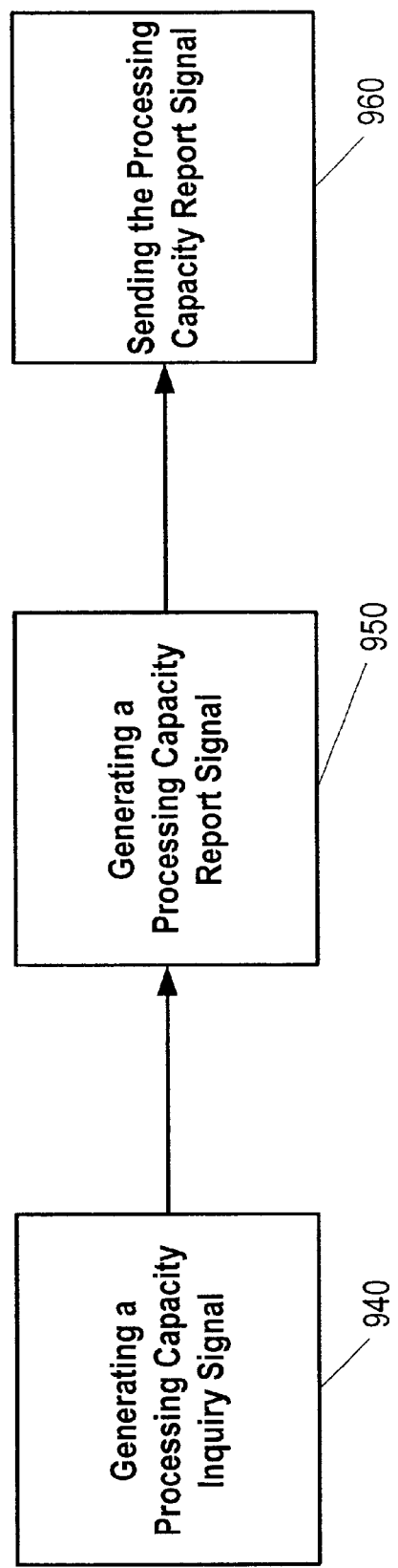
FIG. 9 is a flow chart illustrating the method of the present invention.

It should be recognized that each signal described in this disclosure is defined broadly as a cause and effect relationship. The signal may be direct or indirect, may comprise any number of intermediate steps, and may be integrated together with other signals, as will be understood by those skilled in the art. FIG. 9 is a flow chart showing an embodiment of the method according to the present invention, and the three steps shown may comprise intermediate steps and may involve intervening steps not explicitly shown. The first step 940 is to generate a processing capacity inquiry signal, the second step 950 is to generate a processing capacity report signal, and the third step 960 is to send the processing capacity report signal.

Figure 10:
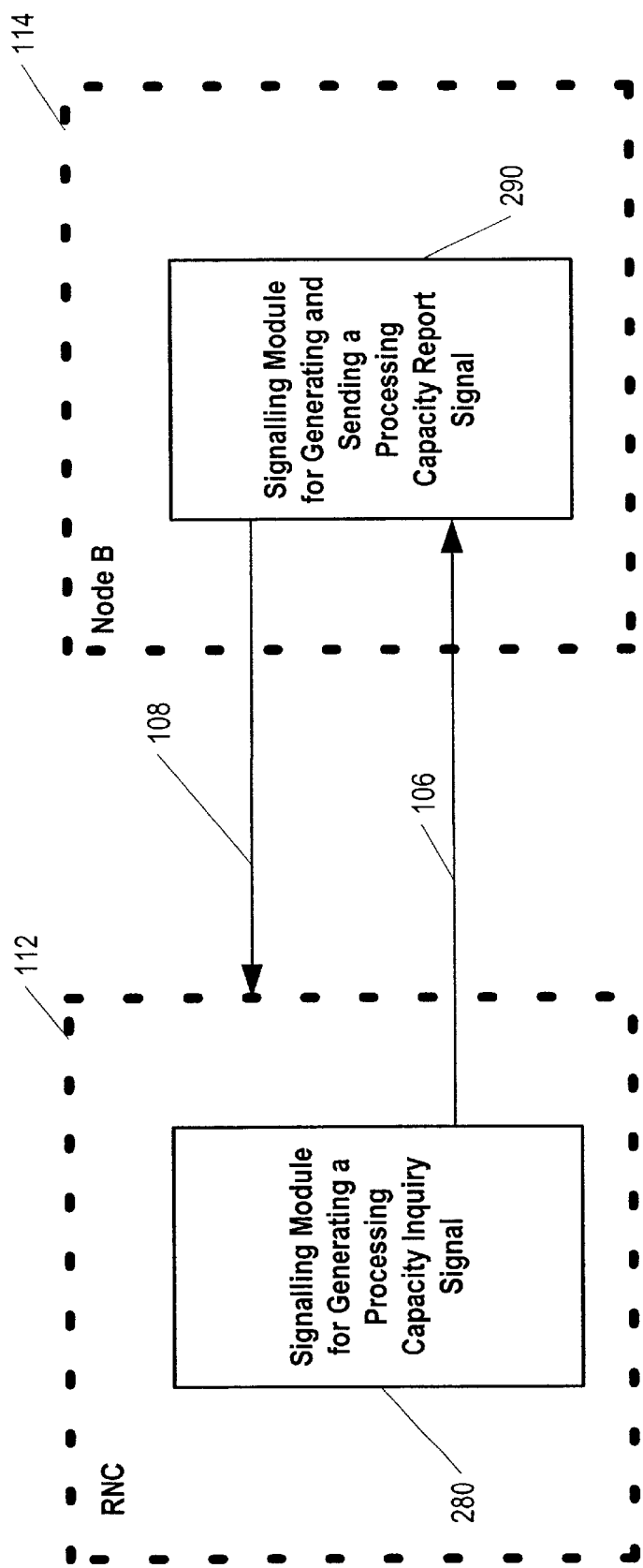
FIG. 10 shows an embodiment of the present invention analogous to FIG. 2, and also showing signalling modules.
Figure 11:
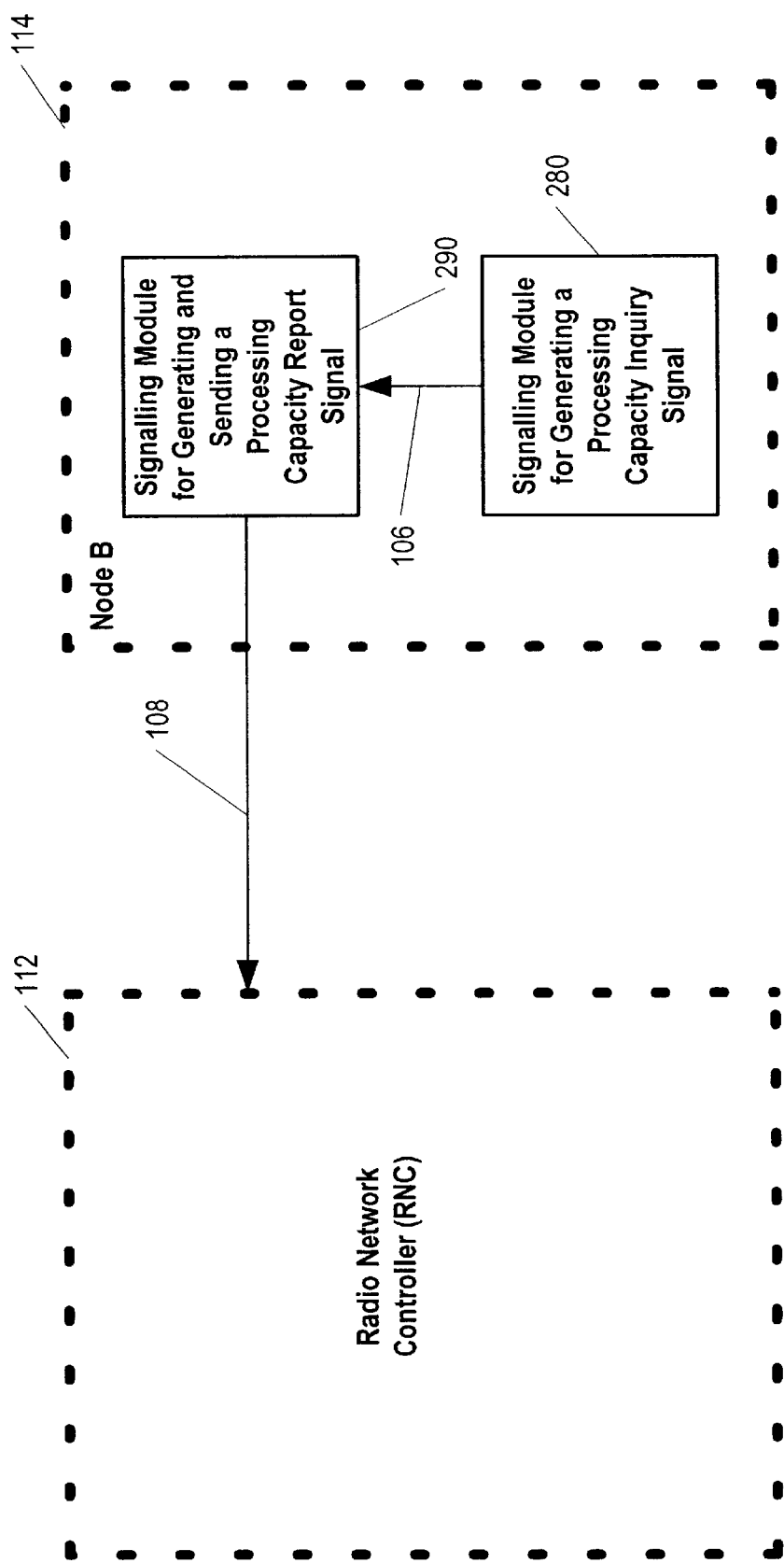
FIG. 11 shows an embodiment of the present invention analogous to FIG. 4, and also showing signalling modules.
Figure 12:
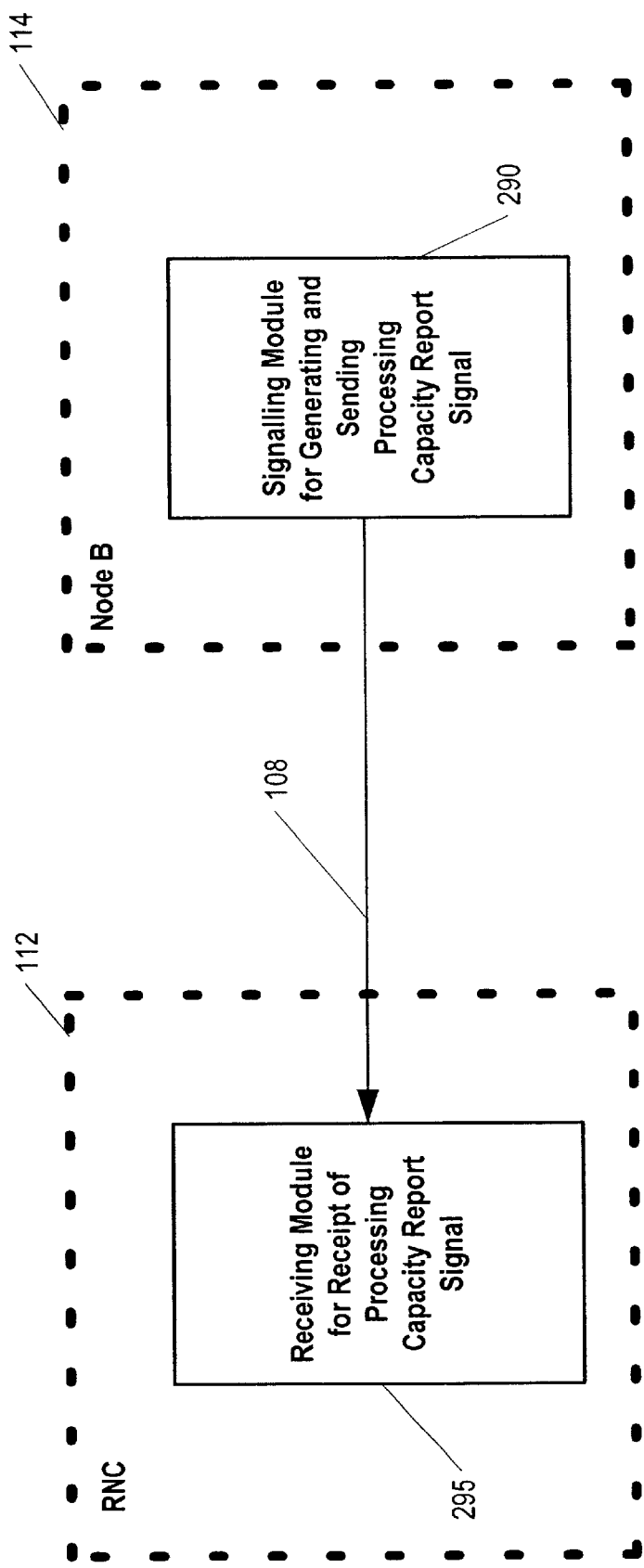
FIG. 12 shows an embodiment of the present invention analagous to FIG. 4, also showing a signalling module and a receiving module.

According to an embodiment of the present invention shown in FIG. 10, the processing capacity inquiry signal on the line 106 is sent from the RNC 112 to the Node B 114, causing the Node B 114 to respond with a processing capacity report signal on the line 108 to the RNC. Within the RNC 112 is a signalling module 280, and likewise there is a second signalling module 290 within the Node B 114, in order to generate these signals. These types of modules are not necessarily separate hardware elements, but rather are functional elements of the present invention, as should be readily apparent to those skilled in the art. According to another embodiment of the present invention, shown by FIG. 11, these signalling modules are all located within the Node B. In addition to a signalling module 290, the present invention also may similarly entail a receiving module 295 at the RNC 112, as shown in FIG. 12, for receiving the processing capacity report signal on the line 108.

Figure 13:
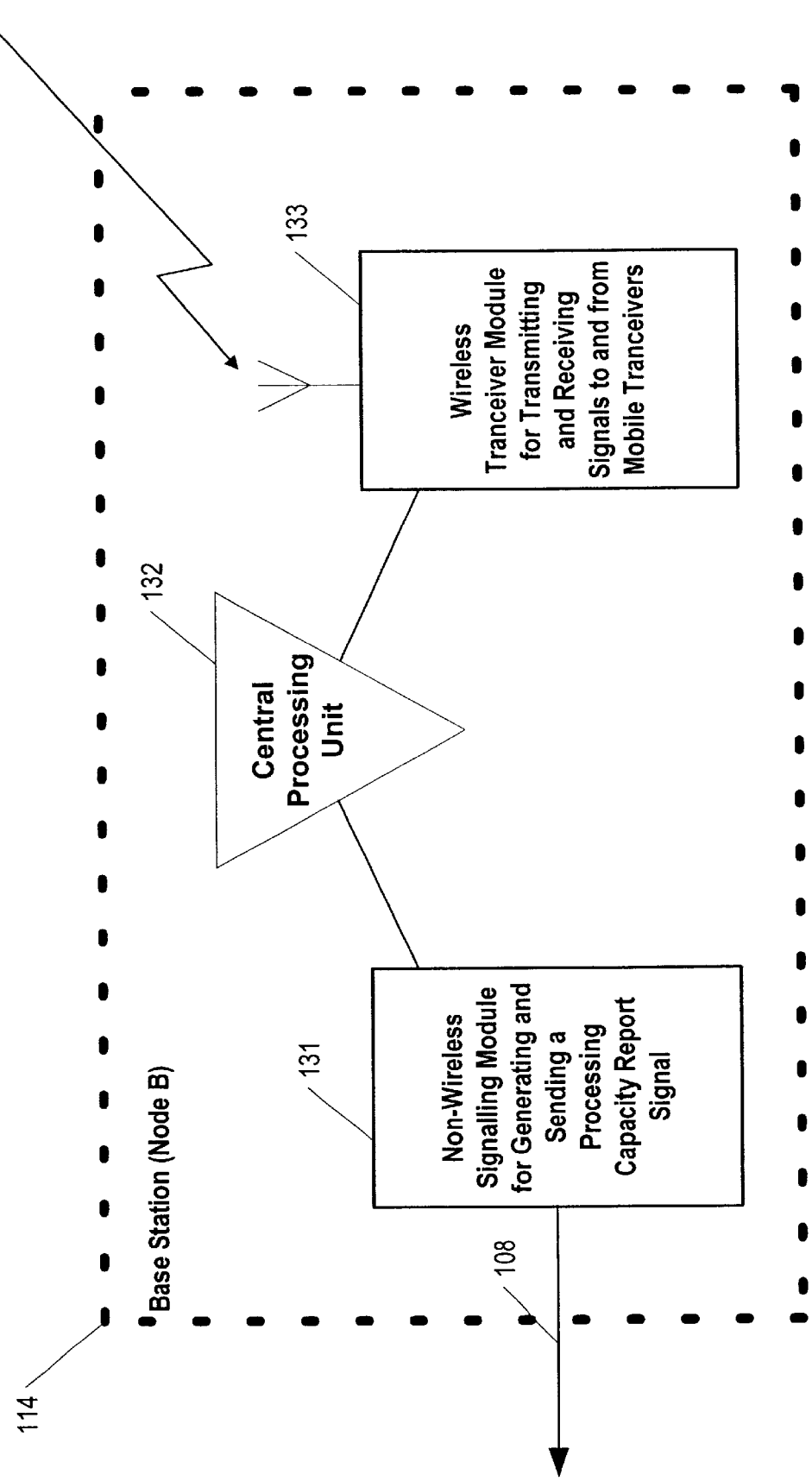
FIG. 13 shows a Node B according to an embodiment of the present invention.

A Node B 114 according to an embodiment of the present invention is shown in FIG. 13. This Node B includes a transceiver module 133 for communicating with mobile transceivers over a wireless interface (the Uu interface shown in FIG. 1), and also a signalling module 131 for providing the processing capacity report signal on the line 108 over a non-wireless interface (the Iub interface shown in FIG. 1). Both of these modules are linked to (or integrated with) a central processing unit 132 in the Node B. The greater the quantity and complexity of traffic through the transceiver module 133, the more processing capacity will be required of the central processing unit 132, and the less processing capacity will be reported by the signalling module 131. Like the signalling modules, the central processing unit 132 should be understood as a functional element, and not necessarily a hardware element, and may comprise various processing units within the Node B 114.

Although this invention has been shown and described with respect to a best mode embodiment thereof, it should be understood by those skilled in the art that the foregoing and various other changes, omissions and additions in the form and detail thereof may be made therein without departing from the spirit and scope of the invention.

What is claimed is:

1. A method for reporting processing capacity of a base station (Node B) to a radio network controller (RNC), in a mobile telecommunications system, thereby enabling the RNC to enhance call control and resource management, comprising the steps of:
   a) generating a processing capacity inquiry signal; and
   b) generating and sending a processing capacity report signal from the base station (Node B) to the RNC, in response to the processing capacity inquiry signal, the processing capacity report signal having a magnitude indicative of available bit rate (ABR) associated with the base station.

2. The method of claim 1, wherein the Node B utilizes a frequency division duplex (FDD) system.

3. The method of claim 2, wherein the processing capacity report signal has a magnitude that is also indicative of a spreading factor associated with the base station (Node B).

4. The method of claim 1, wherein the Node B utilizes a time division duplex (TDD) system.

5. The method of claim 1, wherein the Node B utilizes both an FDD system and a TDD system.

6. The method of claim 1, wherein the processing capacity inquiry signal is provided by the RNC in order to audit logical resources of Node B.

7. The method of claim 1, wherein the processing capacity inquiry signal is provided by a component of Node B in response to a change in the processing capacity of Node B.

8. The method of claim 1, wherein the available bit rate (ABR) includes a downlink ABR.

9. The method of claim 1, wherein the available bit rate (ABR) includes an uplink ABR.

10. The method of claim 1, wherein the available bit rate (ABR) includes both an uplink and a downlink ABR.

11. The method of claim 1, wherein the processing capacity inquiry signal is provided by a component of Node B in response to a change in resource status of Node B.

12. The method of claim 1, wherein the processing capacity inquiry signal is provided by the RNC as part of a radio link setup request.

13. The method of claim 1, wherein the processing capacity inquiry signal is provided by the RNC as part of a radio link addition request.

14. The method of claim 1, wherein the processing capacity inquiry signal is provided by the RNC as part of a radio link deletion request.

15. The method of claim 1, wherein the mobile telecommunications system is a Universal Mobile Telecommunications System (UMTS) which utilizes wideband code division multiple access (WCDMA) and UMTS terrestrial radio access (UTRA).

16. A method for reporting processing capacity of a base station (Node B) to a radio network controller (RNC), in a mobile telecommunications system, thereby enabling the RNC to enhance call control and resource management, comprising the steps of:

a) generating a processing capacity inquiry signal; and b) generating and sending a processing capacity report signal from the base station (Node B) to the RNC, in response to the processing capacity inquiry signal, wherein the processing capacity inquiry signal is provided by the RNC as part of a request selected from the group consisting of a radio link setup request, a radio link addition request, and a radio link deletion request, and wherein the processing capacity report signal has a magnitude indicative of available bit rate (ABR) associated with the base station.

17. The method of claim 16, wherein the mobile telecommunications system is a Universal Mobile Telecommunications System (UMTS) which utilizes wideband code division multiple access (WCDMA) and UMTS terrestrial radio access (UTRA).

18. A system for reporting processing capacity of a base station (Node B) to a radio network controller (RNC), in a mobile telecommunications system, thereby enabling the RNC to enhance call control and resource management, comprising:

a) means for generating a processing capacity inquiry signal; and b) a base station (Node B), comprising means for generating and sending a processing capacity report signal from the base station (Node B) to the RNC in response to the processing capacity inquiry signal, wherein the processing capacity report signal has a magnitude indicative of available bit rate (ABR) associated with the base station.

19. The system of claim 18, wherein the means for generating the processing capacity inquiry signal are located at the RNC.

20. The system of claim 18, wherein the means for generating the processing capacity inquiry signal are located at the Node B.

21. A system for reporting processing capacity of a base station (Node B) to a radio network controller (RNC), in a mobile telecommunications system, thereby enabling the RNC to enhance call control and resource management, comprising:

a) the base station (Node B), which includes means for generating and sending a processing capacity report signal from the base station (Node B) to the RNC, the processing capacity report signal having a magnitude indicative of available bit rate (ABR) associated with the base station (Node B); and b) the RNC, which includes means for receipt of the processing capacity report signal.

22. The system of claim 21, further comprising means for generating a processing capacity inquiry signal, wherein the Node B's means for generating and sending the processing capacity report signal is responsive to the processing capacity inquiry signal.

23. The system of claim 22, wherein the means for generating the processing capacity inquiry signal are located at the RNC.

24. The system of claim 22, wherein the means for generating the processing capacity inquiry signal are located at the Node B.

25. A fixed base station (Node B), in a mobile telecommunications system that also includes a radio network controller (RNC), wherein the base station (Node B) comprises:

means for receiving and transmitting signals between the base station (Node B) and mobile radio tranceivers, over a wireless interface (Uu); and means for generating and sending a processing capacity report signal from the base station (Node B) to the RNC over a non-wireless interface (Iub), the processing capacity report signal having a magnitude indicative of available bit rate (ABR) associated with the base station (Node B).

26. The base station (Node B) of claim 25, further comprising means for generating a processing capacity inquiry signal, wherein the Node B's means for generating and sending a processing capacity report signal is responsive to the processing capacity inquiry signal.

27. The base station (Node B) of claim 25, wherein the Node B's means for generating and sending a processing capacity report signal is responsive to a processing capacity inquiry signal generated by the RNC.

\* \* \* \* \*